United States Patent
Todasco

(10) Patent No.: US 10,160,412 B2
(45) Date of Patent: Dec. 25, 2018

(54) SYSTEM CONFIGURATIONS TO RETRIEVE REVIEW DATA AND TRANSMIT NOTIFICATIONS TO MOBILE DEVICES

(71) Applicant: PAYPAL, INC., San Jose, CA (US)

(72) Inventor: Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/289,639

(22) Filed: Oct. 10, 2016

(65) Prior Publication Data

US 2018/0099630 A1   Apr. 12, 2018

(51) Int. Cl.

| | |
|---|---|
| *H04L 29/08* | (2006.01) |
| *B60R 16/037* | (2006.01) |
| *H04W 4/02* | (2018.01) |
| *H04W 4/04* | (2009.01) |
| *B60N 2/02* | (2006.01) |
| *B60H 1/00* | (2006.01) |
| *G06Q 30/02* | (2012.01) |
| *H04W 88/02* | (2009.01) |

(52) U.S. Cl.
CPC ....... *B60R 16/037* (2013.01); *B60H 1/00735* (2013.01); *B60N 2/0244* (2013.01); *G06Q 30/0282* (2013.01); *H04L 67/22* (2013.01); *H04W 4/023* (2013.01); *H04W 4/046* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2006/0276960 A1* | 12/2006 | Adamczyk | ............. | G06Q 10/06 701/516 |
| 2014/0114877 A1* | 4/2014 | Montano | .......... | G06Q 10/06398 705/347 |
| 2014/0240089 A1* | 8/2014 | Chang | ................. | G07C 9/00111 340/5.61 |
| 2015/0006303 A1* | 1/2015 | Little | ................. | G06Q 30/0282 705/15 |
| 2015/0100457 A1* | 4/2015 | Scipioni | ............. | G06Q 30/0282 705/26.8 |

(Continued)

OTHER PUBLICATIONS

Robert Oshana & Mark Kraeling, Software Engineering for Embedded Systems: Methods, Practical Techniques, and Applications, 2013 (Year: 2013).*

*Primary Examiner* — Tamara L Weber
(74) *Attorney, Agent, or Firm* — Haynes and Boone, LLP

(57) ABSTRACT

Various systems, mediums, and methods may be implemented to retrieve data from a user's mobile device. In one example, a system may determine a number of reviews received by the user's mobile device. Some of the reviews may include poor reviews, such as low ratings (e.g., one or two star ratings), negative written reviews, and/or other forms of data indicative of various establishments and/or services. In such instances, the system may generate notifications and transmit the notifications to merchant devices, such that the merchants may be alerted of the user having a history of providing poor reviews. As such, the system and/or the merchants may be notified accordingly to ensure the user will be satisfied with the services provided and to avoid a negative review from the user.

20 Claims, 12 Drawing Sheets

(56) References Cited

U.S. PATENT DOCUMENTS

| | | | |
|---|---|---|---|
| 2015/0356644 A1* | 12/2015 | Diana | G06Q 30/0282 |
| | | | 705/347 |
| 2016/0171574 A1* | 6/2016 | Paulucci | G07B 15/02 |
| | | | 705/13 |
| 2016/0180404 A1* | 6/2016 | Stern | G06O 30/0269 |
| | | | 705/14.58 |
| 2017/0193530 A1* | 7/2017 | Newsum | G06Q 30/0201 |
| 2017/0214973 A1* | 7/2017 | Slaughter | H04N 21/4316 |

* cited by examiner

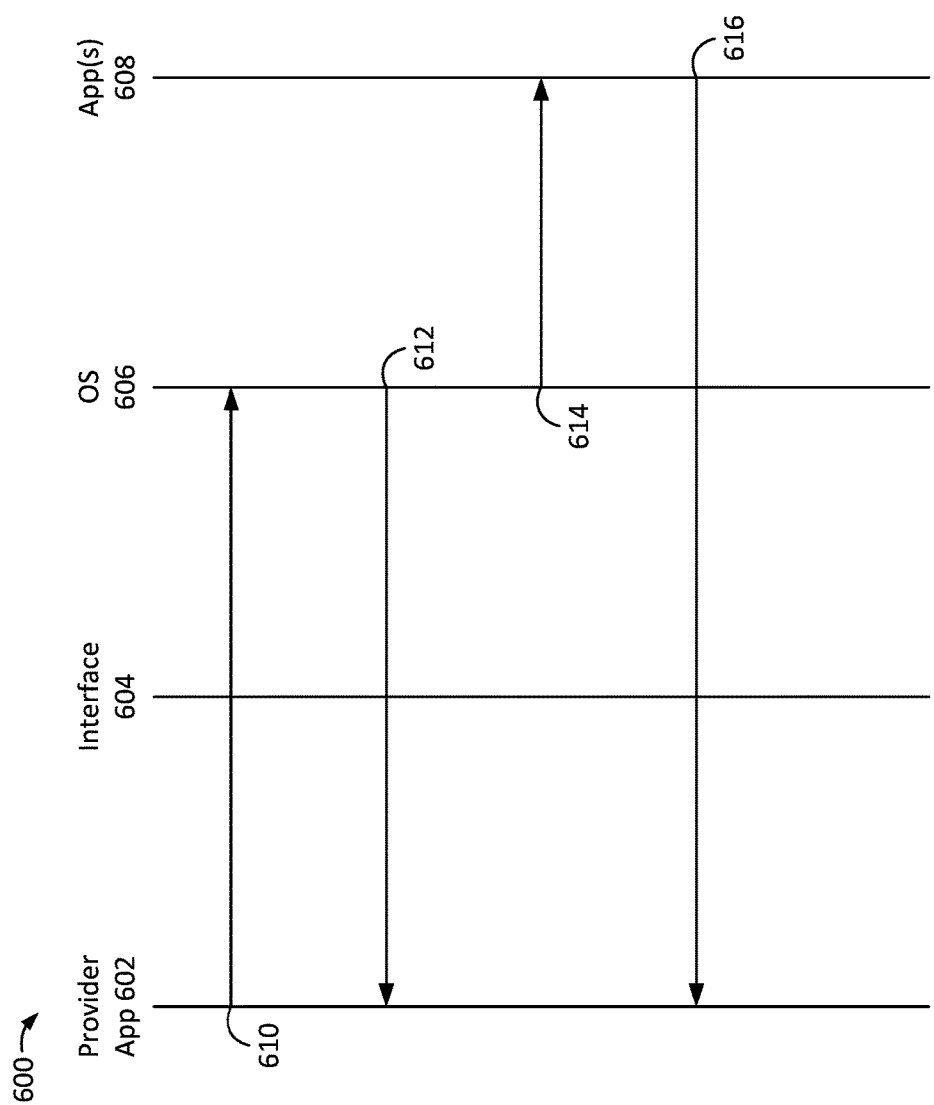

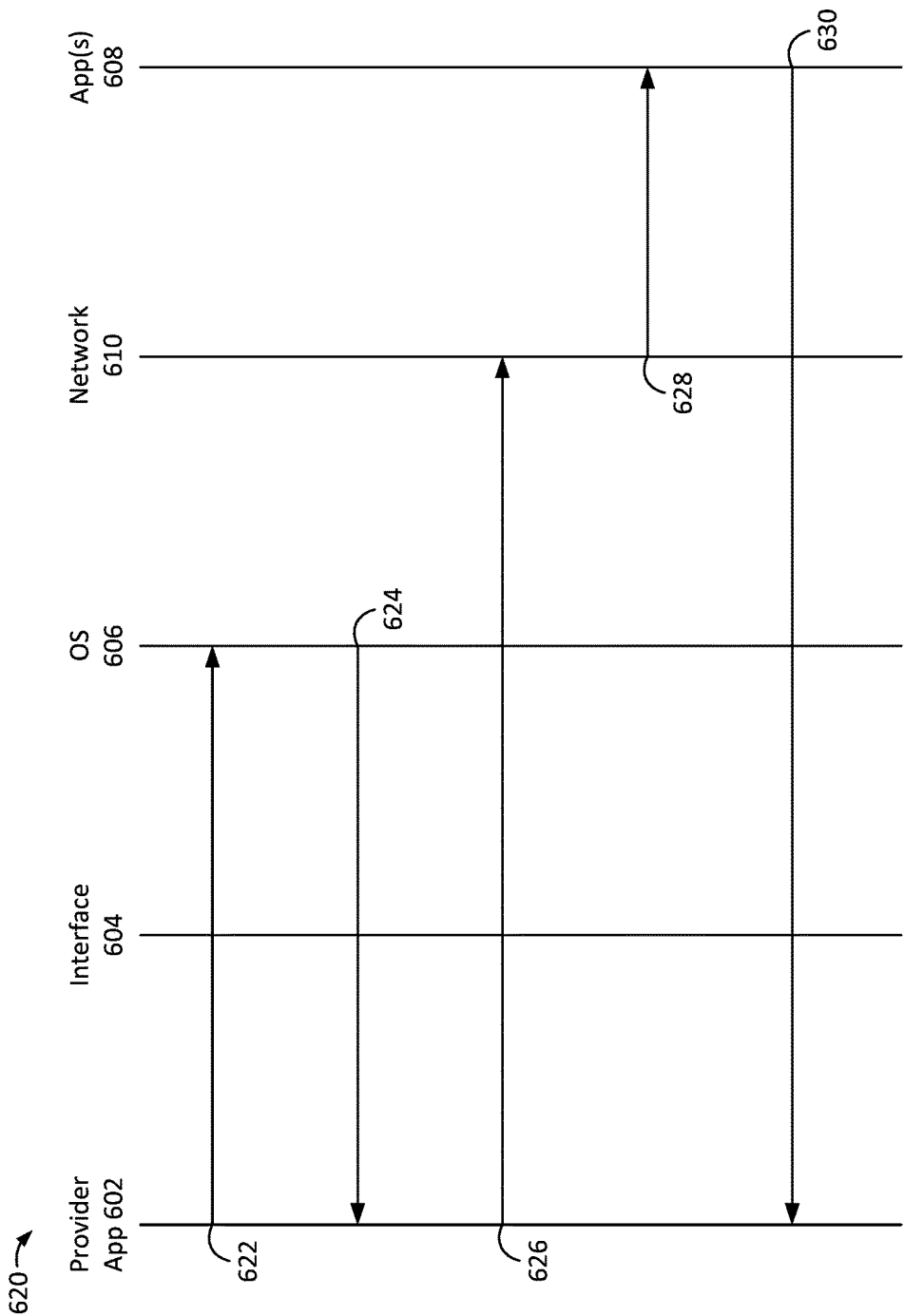

SYSTEM CONFIGURATIONS TO RETRIEVE REVIEW DATA AND TRANSMIT NOTIFICATIONS TO MOBILE DEVICES

BACKGROUND

Mobile applications or "apps" are becoming increasingly more prevalent in the modern world. It is not uncommon for a single user to have multiple mobile apps installed on their personal computing device. For example, consider a scenario where a user has numerous mobile apps on her computing device. For illustrative purposes, consider the user has an app for rating various restaurants, an app for requesting ride-share vehicles, and an app for making appointments, among other possible apps. In such a scenario, the user may utilize the respective apps to rate various restaurants, drivers of ride-share vehicles, and/or providers that perform services for the user.

As such, various forms of data specific to the user may be provided through the apps, such as the user's preferences for cleanliness in restaurants, the user's preferences for drivers that drive carefully, and/or the user's preferences for service providers that are punctual, among other preferences specific to the user. Thus, various restaurant owners, drivers of ride-share vehicles, and service providers, among various other entities, may wish to have access to such data to know the user's preferences and provide services accordingly. However, in various circumstances, the data may be inaccessible to these entities, the data may be difficult to obtain due to restricted accesses, and/or the data may be costly to retrieve in cases where the data is accessible, among other possibilities.

As demonstrated above, there are various technical problems in mobile technology and backend infrastructures, particularly with determining how to access data provided through mobile apps, determining what data may be made available to other entities, and how the data may be used to benefit the user and the entities, among other challenges as well.

BRIEF DESCRIPTION OF THE DRAWINGS

FIG. 6A illustrates an exemplary process, according to an embodiment; and

FIG. 6B illustrates an exemplary process, according to an embodiment.

Figure 1:
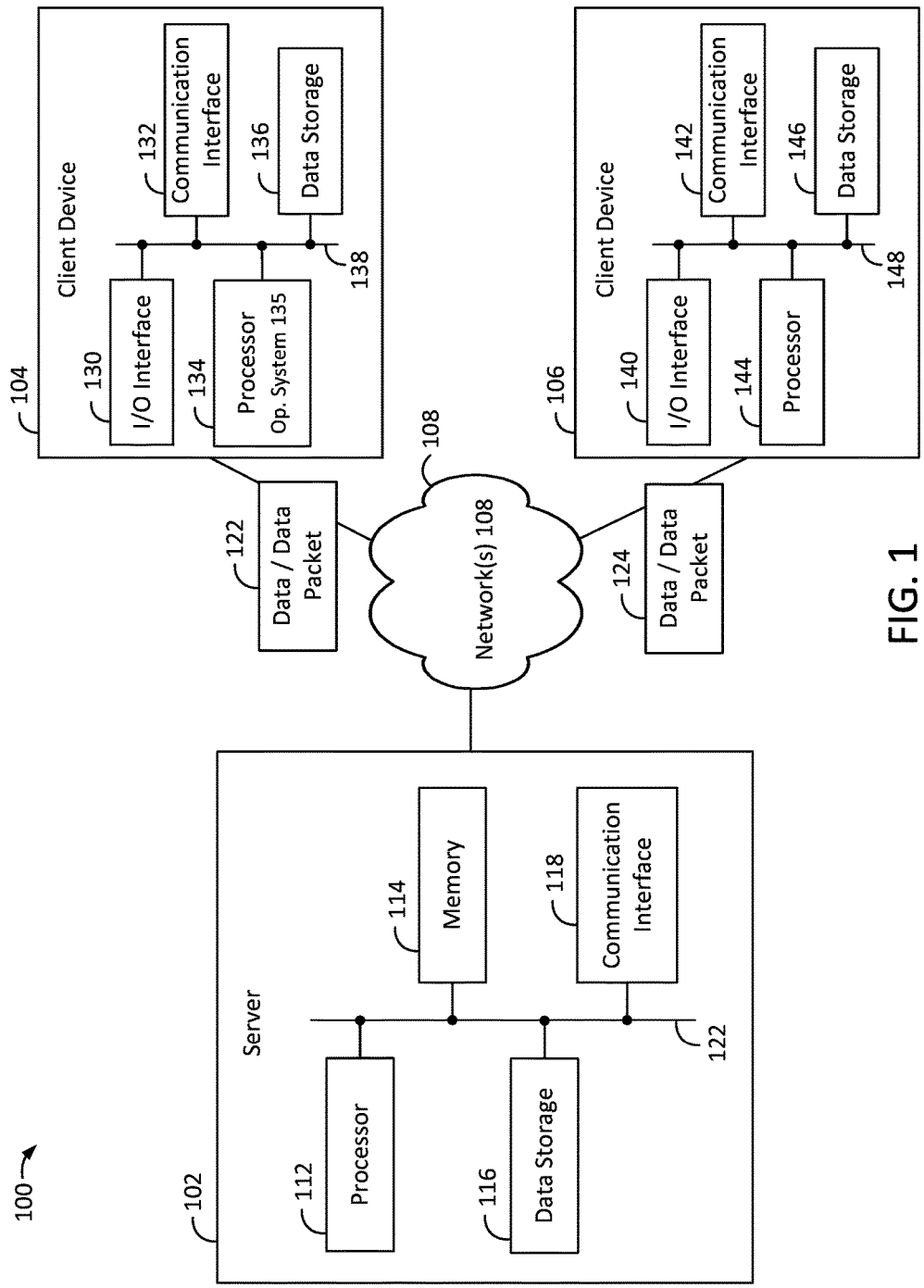
FIG. 1 is a block diagram of an exemplary system, according to an embodiment.

Embodiments of the present disclosure and their advantages may be understood by referring to the detailed description herein. It should be appreciated that reference numerals may be used to illustrate various elements and features provided in the figures. The figures may illustrate various examples for purposes of illustration and explanation related to the embodiments of the present disclosure and not for purposes of any limitation.

DETAILED DESCRIPTION

In one example, consider the scenario described above where a user has an app on her smartphone for rating various restaurants, an app for calling ride-share vehicles, and an app for making appointments, among other possible apps. Yet further, consider the smartphone has a service provider application or a "provider app" configured to process transactions with the user's account maintained with a given service provider, such as PayPal, Inc. of San Jose, Calif., USA. In this scenario, the provider app may have access to the user's ratings of restaurants provided through the restaurant app, the user's ratings of the drivers provided through the ride-share app, and also the user's ratings of the services provided through the service apps, among other forms of review data. In some instances, the provider app may have access to the smartphone's operating system to retrieve the review data that indicates the user's ratings of the restaurants, drivers, and/or service providers (e.g., stylists, nail salons, barbers), among other possible establishments and/or services. Thus, the systems described herein provide technology-based solutions that overcome the problems described above involving the ability to access data provided through mobile apps.

In some embodiments, the systems described herein may determine a number of negative reviews the user provides through one or more of the apps. For example, the user may be impatient with those waiting tables and the user may frequently provide negative reviews (e.g., one star reviews out of five stars) through the restaurant app. In another example, the user may frequently provide negative reviews through the ride-sharing app, possibly where the user may be sensitive to motion sickness from aggressive driving. In yet another example, the user may frequently provide negative reviews through the service app based on the service providers being late to appointments scheduled with the service app.

Thus, the systems described herein provide technology-based solutions to determine the rating indicator, such as the average ratings of the reviews (e.g., one to two stars out of five stars), the frequency of negative reviews the user may provide over time, the commonality and/or the repetition of written reviews (e.g., reviews involving wait times before being seated), among other possibilities. Further, the systems described herein overcome the technical problems described above with determining what data may be made available to alert other merchants regarding a particular user, such that the merchants may perform services to avoid a negative review from the user. The systems described herein may provide various forms of review data to the other entities to improve existing technical fields or technologies by enabling merchants to proactively provide better services, user experiences, and to avoid negative reviews.

In some embodiments, the systems described herein may determine the locations of the user's smartphone to detect whether the smartphone is proximate to other merchants and/or entities. As such, the systems may alert the other restaurant owners that the user may, for example, expect quick or fast service, possibly from those waiting tables at restaurants. Further, the systems may alert drivers of ride-sharing vehicles that the user, for example, expects a smooth ride and/or safe driving without the vehicle exceeding the posted speed limits Yet further, the system may alert service providers that the user expects, for example, the service providers to be punctual and ready at the time of the appointment. In various such circumstances, other restaurant owners, drivers of ride-sharing vehicles, and/or service providers that encounter the user may find the history of these reviews to be highly valuable and useful, such that they may avoid a negative review. Further, the user may encounter improved experiences based on the other merchants and/or entities having access to the history of these reviews.

In other embodiments, the systems described herein may provide various rating indicators associated with a user engaging with a merchant or other entity. Rating indicators may include a number of reviews made, types of entities reviewed, a ratio of positive reviews to negative reviews, common issues that cause a positive or negative review, a time and/or day of a week, a month, and/or a year the user typically submits reviews, submits positive reviews, and/or submits negative reviews. Further, rating indicators may provide whether the user submits reviews when the user is at engaged with the entity by themselves or with others, the number of "friends" the user has online or is followed by, one or more of which may provide an indication of how popular or meaningful the user's review may be, the age and/or gender of the user, and any other indication of whether the entity and/or merchant would want to treat the user differently. Thus, the systems described herein provide technology-based solutions to provide how review data may be used to benefit the user and various merchants. Thus, such technology-based solutions improve various user and merchant processes to adapt to the user's preferences and efficiently satisfying users.

FIG. 1 is a simplified block diagram of an exemplary system 100, according to an embodiment. As shown, the system 100 may include a server 102. The server 102 may be configured to perform operations of a service provider, such as PayPal, Inc. of San Jose, Calif., USA. Further, the system 100 may also include a client device 104 and a client device 106. As such, the server 102 and the client devices 104 and 106 may be configured to communicate over the one or more communication networks 108. As shown, the system 100 includes multiple computing client devices 102, 104, and/or 106.

The system 100 may operate with more or less devices than the computing devices 102, 104, and/or 106 shown in FIG. 1, where each device may be configured to communicate over the one or more communication networks 108, possibly to transfer data from one device to another. The one or more communication networks 108 may include a packet-switched network configured to provide digital networking communications and/or exchange data of various forms, contents, types, and/or structures. In some instances, the one or more communication networks 108 may include a data network, a private network, a local area network, a wide area network, a telecommunications network, and/or a cellular network, among other possible networks. In some instances, the communication network 108 may include network nodes, web servers, base stations, microcells, switches, routers, and/or various buffers/queues to transfer data/data packets 122 and/or 124.

The data/data packets 122 and/or 124 may include the various forms of reviews provided with user inputs. The data/data packets 122 and/or 124 may be transferrable using communication protocols such as packet layer protocols, packet ensemble layer protocols, and/or network layer protocols, among other types of communication protocols. For example, the data/data packets 122 and/or 124 may be transferrable using transmission control protocols and/or internet protocols (TCP/IP). In various embodiments, each of the data/data packets 122 and 124 may be assembled or disassembled into larger or smaller packets of varying capacities, such as capacities varying from 1,000 to 1,100 bytes, for example, among other possible data capacities. As such, data/data packets 122 and/or 124 may be transferrable over the one or more networks 108 and to various locations in the one or more networks 108.

In some embodiments, the server 102 may take a variety of forms. The server 102 may be an enterprise server, possibly operable with one or more operating systems to facilitate the scalability of the architecture within the system 100. For example, the server 102 may operate with a UNIX-based operating system configured to integrate with a growing number of other servers in the one or more networks 108, the client devices 104 and/or 106, among other computing devices configured to communicate with the system 100. The server 102 may further facilitate workloads for performing numerous data transfers with the client devices 104 and/or 106. In particular, the server 102 may facilitate the scalability relative to an increasing number of data transfers to improve and/or eliminate data congestion, bottlenecks, and/or data transfer delays.

In some embodiments, the server 102 may include multiple components, such as one or more hardware processors 112, non-transitory memories 114, non-transitory data storages 116, and/or communication interfaces 118, among other possible components described in relation to FIG. 1, any of which may be communicatively linked via a system bus, network, or other connection mechanism 122. The one or more hardware processors 112 may take the form of a multi-purpose processor, a microprocessor, a special purpose processor, a digital signal processor (DSP) and/or other types of processing components. For example, the one or more hardware processors 112 may include an application specific integrated circuit (ASIC), a programmable system-on-chip (SOC), and/or a field-programmable gate array (FPGA). In particular, the one or more hardware processors 112 may include a variable-bit (e.g., 64-bit) processor architecture configured to transfer the data packets 122 and/or 124. As such, the one or more hardware processors 112 may execute varying instructions sets (e.g., simplified and complex instructions sets) with fewer cycles per instruction than other general-purpose hardware processors, thereby improving the performance of the server 102. Thus, the server 102 improves existing technical fields or server architectures/technologies as further described herein.

In practice, the one or more hardware processors 112 may be configured to read instructions from the non-transitory memory component 114 to cause the system 100 to perform operations. The system 100 may determine a provider application installed on the client device 104, where the provider application retrieves data from an operating system 135 of the client device 104. The system 100 may determine a location of the client device 104 from the data retrieved from the operating system 135, where the location of the client device 104 corresponds to a location of a client device 106. For example, the location of the client device 104 may be proximate the location of the client device 106, possibly where the locations of the respective devices 104 and 106 are in the same building. The system 100 may identify review data from the data retrieved from the operating system 135 based on the location of the client device 104, where the review data indicates a number of review inputs received by a display interface 130 of the client device 104. The system 100 may also determine a rating indicator, such as an average rating based on the review data. The system 100 may also transmit a notification with the data packet 124 to the client device 106 including the rating indicator, such as the average rating. Thus, the system 100 may improve existing technical fields or server technologies by enabling merchants to receive the review data in real-time, proactively provide better user experiences, and avoid negative reviews.

The non-transitory memory component 114 and/or the non-transitory data storage 116 may include one or more volatile, non-volatile, and/or replaceable storage components, such as magnetic, optical, and/or flash storage that may be integrated in whole or in part with the one or more hardware processors 112. Further, the memory component 114 may include or take the form of a non-transitory computer-readable storage medium, having stored thereon computer-readable instructions that, when executed by the hardware processing component 112, cause the server 102 to perform operations described in this disclosure, illustrated by the accompanying figures, and/or otherwise contemplated herein.

The communication interface component 118 may take a variety of forms and may be configured to allow the server 102 to communicate with one or more devices, such as the client devices 104 and/or 106. For example, the communication interface 118 may include a transceiver that enables the server 102 to communicate with the client devices 104 and/or 106 over the one or more communication networks 108. In some instances, the communication interface 118 may include a wired interface, such as an Ethernet interface, to communicate with the client devices 104 and/or 106. Further, in some instances, the communication interface 118 may include a cellular interface, such as a Global System for Mobile Communications (GSM) interface, a Code Division Multiple Access (CDMA) interface, and/or a Time Division Multiple Access (TDMA) interface. In one example, where the server 102 is a wireless server, the communication interface 118 may include a wireless local area network interface such as a WI-FI interface configured to communicate with a number of different protocols. As such, the communication interface 118 may include a wireless interface operable to transfer data over short distances utilizing short-wavelength radio waves in approximately the 2.4 to 2.485 GHz range. In some instances, the communication interface 118 may send/receive data packets 122 and/or 124 to/from client devices 104 and/or 106.

The client devices 104 and 106 may also be configured to perform a variety of operations as further described herein. In particular, the client devices 104 and 106 may be configured to transfer data packets 122 and/or 124 to and from the server 102. The data packets 122 and/or 124 may include data retrieved from an operating system, review data, user review profiles, location data, data generated based on respective locations of the client device 104 and 106, mobile application data, data associated with configurations of the mobile applications, device configuration data, content and/or related data, image data, inquiry data, and/or response data, among other types of data. Further, the data packets 122 and/or 124 may also include location data such as Global Positioning System (GPS) data or GPS coordinate data, triangulation data, beacon data, WI-FI data, sensor data, movement data, and/or temperature data, among other types of data.

In some embodiments, the client devices 104 and 106 may take the form of a smartphone system, a personal computer (PC) such as a laptop device, a tablet computer device, a point-of-sale (POS) device, a card reader device, a wearable computer device, a head-mountable display (HMD) device, a smart watch device, and/or other types of computing devices configured to transfer data associated with a user account. The client devices 104 and 106 may include various components, including, for example, input/output (I/O) interfaces 130 and 140, communication interfaces 132 and 142, hardware processors 134 and 144, and non-transitory data storages 136 and 146, respectively, all of which may be communicatively linked with each other via a system bus, network, or other connection mechanisms 138 and 148, respectively.

The I/O interfaces 130 and 140 may be configured to receive inputs from and provide outputs to respective users of the client devices 104 and 106. For example, the I/O interface 130 may include a graphical user interface (GUI) configured to receive a user input that activates the provider application with the other applications. Thus, the I/O interfaces 130 and 140 may include displays and/or input hardware with tangible surfaces such as touchscreens with touch sensors and/or proximity sensors configured with variable sensitivities to detect the user touches and touch inputs. The I/O interfaces 130 and 140 may also be synched with a microphone, sound speakers, and/or other audio mechanisms configured to receive voice commands Further, the I/O interfaces 130 and 140 may also include a computer mouse, a keyboard, and/or other interface mechanisms. In addition, I/O interfaces 130 and 140 may include output hardware, such as one or more touchscreen displays, haptic feedback systems, and/or other hardware components.

In some embodiments, communication interfaces 132 and 142 may take a variety of forms. For example, communication interfaces 132 and 142 may be configured to allow client devices 104 and 106, respectively, to communicate with one or more other devices according to a number of protocols described herein. For instance, communication interfaces 132 and 142 may be configured to allow client devices 104 and 106, respectively, to communicate with the server 102 over the one or more communication networks 108. The processors 134 and 144 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components described or contemplated herein. As shown, the processor 134 may be implemented with an operating system, such as operating system 135. In some instances, operating system 135 may be a mobile operating system such as ANDROID™ OS, iPhone™ OS, and/or WINDOWS™ mobile, among other possibilities.

The data storages 136 and 146 may include one or more volatile, non-volatile, removable, and/or non-removable storage components, and may be integrated in whole or in part with processors 134 and 144, respectively. Further, data storages 136 and 146 may include or take the form of non-transitory computer-readable mediums, having stored thereon instructions that, when executed by processors 134 and 144, cause the client devices 104 and 106 to perform operations, respectively, such as those described in this disclosure, illustrated by the accompanying figures, and/or otherwise contemplated herein.

In some embodiments, a provider application may be installed on the client device 104. The provider application may give the user of the client device 104 access to the user's account with a provider, such as PayPal, Inc. of San Jose, Calif., USA. Further, the client device 104 may be configured to transfer funds to and from the user account. In particular, the client device 104 may be used to generate and/or transfer the data packet 122 to request a connection with the server 102. As such, the data packet 122 may initiate a search of an internet protocol (IP) address of the server 102 that may take the form of the IP address, "192.168.1.102," for example. In some instances, an intermediate server, e.g., a domain name server (DNS) and/or a web server, possibly in the one or more networks 108 may identify the IP address of the server 102 to establish the connection between the client device 104 and the server 102. As such, the server 102 may complete the transfer of funds, possibly based on the data packet 122 that the server 102 retrieves.

It can be appreciated that the server 102 and the client devices 104 and/or 106 may be deployed in various other ways. For example, the operations performed by the server 102 and/or the client devices 104 and 106 may be performed by a greater or a fewer number of devices. Further, the operations performed by two or more of the devices 102, 104, and/or 106 may be combined and performed by a single device. Yet further, the operations performed by a single device may be separated or distributed among the server 102 and the client devices 104 and/or 106. In addition, the client devices 104 and/or 106 may be operated and/or maintained by different users such that each client device 104 and/or 106 may be associated with respective user accounts.

Figure 2A:
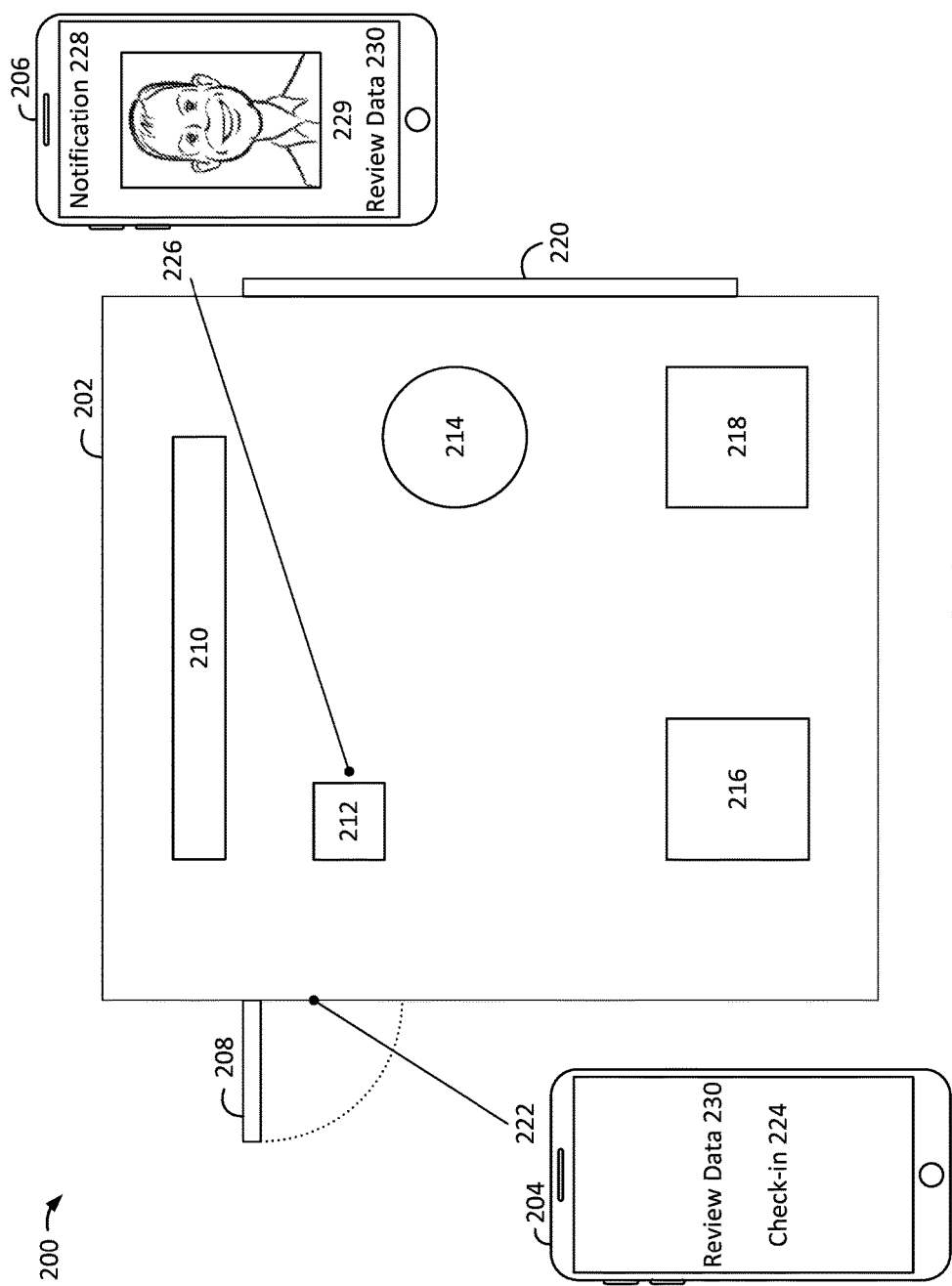
FIG. 2A illustrates an exemplary system with client devices, according to an embodiment.

FIG. 2A illustrates an exemplary system 200 with client devices 204 and 206, according to an embodiment. The system 200 may include aspects of the system 100 described above in FIG. 1, such as the server 102 and/or the one or more networks 108. The client devices 204 and 206 may take the form of the client devices 104 and 106, respectively, described above in relation to FIG. 1. In one example, FIG. 2A provides a map 202 of a restaurant with a door 208, a bar 210, a hosting booth 212, tables 214, 216, and/or 218, among other possible tables, and a window 220, among other possible windows. In one scenario, a user of the client device 204 may be opening the door 208 to enter the restaurant. In such a scenario, the system 200 may alert various workers in the restaurant that the user has previously provided negative reviews, such the workers may provide the user with proper attention to avoid a negative review regarding the restaurant.

In some embodiments, the system 200 may determine or identify a provider application installed on the client device 204, also referred to as the mobile device 204. For example, the system 200 may identify the provider application installed on the mobile device 204 through communication over a network, such as the one or more networks 108 described above. The provider application may be configured to retrieve data from an operating system of the mobile device 204. For example, considering the scenario where the mobile device 204 takes the form of the client device 104 described above, the provider application may retrieve data from the operating system 135.

In some embodiments, the system 200 may identify review data 230 from the data retrieved from the operating system 135. In some instances, the review data 230 may indicate a number of review inputs received by a display of the mobile device 204. For example, considering where the mobile device 204 takes the form of the client device 104, the review data 230 may indicate a number of review inputs received by the I/O interface 130. In another example, the review data 230 may indicate review inputs including ratings, possibly ranging from one star to five stars. In some instances, the ratings may be a score ranging from one to ten, or a percentage from zero to one-hundred, among other possibilities.

As noted, the review inputs received may include a number of negative review inputs, such as one or two star ratings, ratings ranging from one to three out of ten, and/or percentages ranging from one to thirty out of one hundred, among other possibilities. Further, the system 200 may determine the review data 230 indicates a frequency of the negative review inputs. For example, the system 200 may determine the user makes negative reviews on a daily basis, a weekly basis, and/or a monthly basis, among other possibilities, possibly also determining a percentage of negative reviews from all reviews posted or submitted by the user. In such instances, the system 200 may transmit the notification 228 to the merchant device 206 to alert the restaurateur and/or the workers regarding the user's negative reviews provided previously, such that the restaurateur may avoid a similar negative review.

In some embodiments, the system 200 may determine a location 222 of the mobile device 204 from the data retrieved from the operating system 135. As noted, the user of the mobile device 204 may be opening the door 208 to enter the restaurant. As such, the location 222 of the mobile device 204 may indicate the user is entering the restaurant. The location 222 of the mobile device 204 may correspond to a location 226 of a client device 206, also referred to as a merchant device 206. For example, the merchant device 206 may be located at the hosting booth 212 to track users waiting for the tables 214, 216, and/or 218, among other possible tables. In one scenario, the merchant device 206 may be a tablet device that the host/hostess may use to track the users waiting for the tables 214, 216, and/or 218. In some embodiments, the system 200 may determine a check-in 224 from the data retrieved from the operating system 135 of the mobile device 204. In some instances, the check-in 224 may correspond to the location 222 of the mobile device 204. As such, the system 200 may determine the location 222 of the mobile device 204 based on the check-in 224.

In some instances, the system 200 may identify the review data 230 from the data retrieved based on the location 222 of the mobile device 204. For example, the system 200 may identify and/or retrieve the review data 230 based on the location 222 indicating the user is entering the restaurant, such that the restaurateur and/or the workers may be alerted accordingly. In some instances, the system 200 may determine a rating indicator, such as an average rating, based on the review data 230. For example, rating indicator and/or the average rating or review may be one star out of five stars, or possibly 1.5 stars out of five stars. The system 200 may also transmit a notification 228 to the merchant device 206 to cause the merchant device 206 to display the review data 230, possibly displaying the rating indicator and/or the average rating. The notification 228 may also include an image 229 of the user of the mobile device 204. For example, the notification 228 may alert the host/hostess that the user of the mobile device 204 has a low average rating of one star out of five stars, such that the host/hostess may be alerted to prevent a negative review.

The system 200 may also identify one or more preferences from the review data 228 in response to the check-in 224. In one example, the one or more preferences may be to sit in areas in restaurants with nicer views, e.g., closer to windows at such restaurants. In another example, the one or more preferences may be to be seated at a table within a short time period (e.g., 15 minutes) of walking or entering into a restaurant. In some instances, the notification 228 transmitted to the merchant device 206 may include the one or more preferences. Consider the scenario where one of the user's preferences may be to sit closer to windows when dining at restaurants. In one scenario, the host/hostess may sit the user at one of the tables 214 and/or 218 available, as opposed to the table 216.

In some embodiments, the system 200 may determine a number of scores from the review data 230 that corresponds to the number of review inputs received by the display of the mobile device 204, such as the inputs received by the I/O interface 130. For example, the number of scores may range from one star to three stars out of five stars, a score ranging from one to six out of a score of ten, and/or a percentage score ranging from one to sixty out of one-hundred percent, among other possibilities. The system 200 may determine an average of the number of scores, such as an average number of stars, an average score out of ten, and/or an average percentage score out of one-hundred, among other possibilities. Further, the average rating may be determined based on the average of the number of scores. For example, the average rating may take the form of the average number of scores out of ten and/or the average percentage scores out of one hundred, among other possibilities. Thus, the notification 228 may indicate the average number of scores, such that the host/hostess may provide better services to the user of the mobile device 204.

Figure 2B:
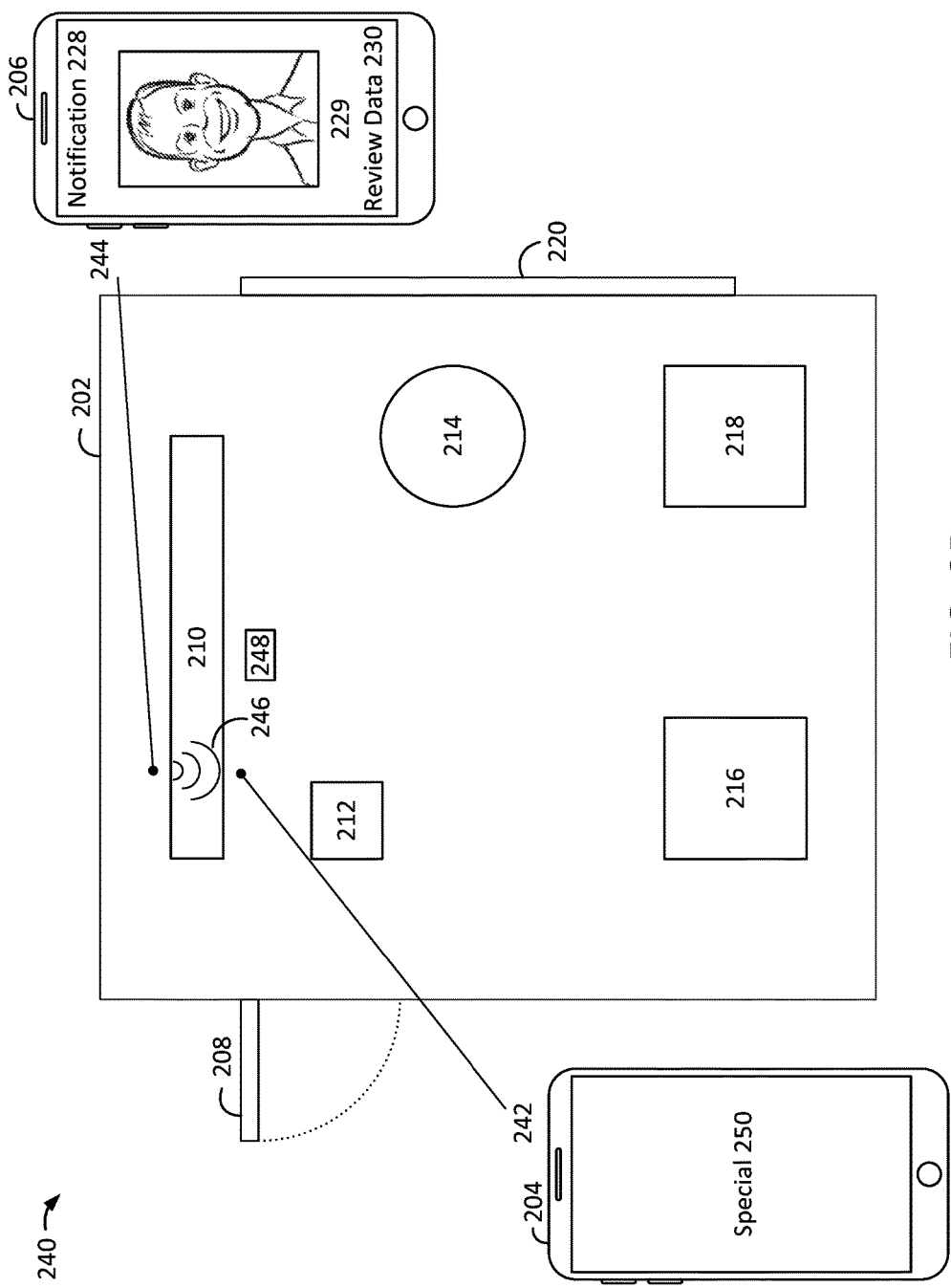
FIG. 2B illustrates an exemplary system with client devices and respective locations of the client devices, according to an embodiment.

FIG. 2B illustrates an exemplary system 240 with the client devices 204 and 206, and respective locations 242 and 244 of the client devices 204 and 206, according to an embodiment. The system 240 may also include aspects of the system 100 described above in FIG. 1, such as the server 102 and/or the one or more networks 108. The client devices 204 and 206 may take the form of the client devices 104 and 106, respectively, described above in relation to FIG. 1. In one example, FIG. 2B also provides the map 202 of a restaurant with the door 208, the bar 210, the hosting booth 212, the table 214, the table 216, the table 218, and the window 220. In one scenario, the user of the mobile device 204 may be proximate to the bar 210, possibly waiting to be seated at one of the tables 214 or 218. In this scenario, the system 200 may alert the bartender with the merchant device 206 regarding the user of the mobile device 204. For example, the system 200 may provide the image 229 of the user and the review data 230 indicating a number of negative reviews previously provided by the user, such that the bartender may provide services to the user to avoid a negative review. Additional information may be provided, such as common causes that prompted a negative (or a positive) review from the user.

In some embodiments, the system 240 may identify a second location 242 of the mobile device 204 from the data retrieved from the operating system of the mobile device 204. For example, considering the mobile device 204 takes the form of the client device 104, the system 240 may identify the second location 242 of the mobile device 204 from the data retrieved from the operating system 135, possibly including global positioning system (GPS) data, GPS coordinates, proximity data, and/or beacon location data. The second location 242 may be in front of the bar 210, possibly where the user of the mobile device 204 may be waiting to be seated at one of the tables 214 or 218 next to the window 220.

In some embodiments, the system 240 may also generate data for a special 250 based on the second location 242 of the mobile device 204. For example, the special 250 may be for a free beverage or discounted beverage at the bar 210. The system 240 may transmit the generated data including the special 250 to the mobile device 204 such that the user may be alerted of the special 250 on the display of the mobile device 204. In some instances, the system 240 may request a confirmation from the merchant device 206 to send the special 250 to the mobile device 204 prior to transmitting the special 250. As such, the system 240 may transmit the generated data including the special 250 to the mobile device 204 based on a confirmation received from the merchant device 206 to transmit the special 250 to the mobile device 204. Yet, the system 240 may transmit the special 250 to the merchant device 206 and the merchant device 206 may transmit the special 250 to the mobile device 204 over the wireless signals 246, which may be short range wireless signals, such as BLUETOOTH® and/or near field communication (NFC) signals.

In some embodiments, the system 240 may also generate data to include a token 248. In some instances, the token 248 may be a drink token generated based on the second location 242 of the mobile device 204 proximate to the bar 210. The system 240 may also transmit the token 248 to the mobile device 204 based on the location 242 of the mobile device 204, such that the user may be alerted of the token 248 on the display of the mobile device 204. In some instances, the system 240 may request a confirmation from the merchant device 206 to send the token 248 to the mobile device 204 prior to transmitting the token 248. As such, the system 240 may transmit the token 248 to the mobile device 204 based on a confirmation received from the merchant device 206 to transmit the token 248 to the mobile device 204. Yet, the system 240 may transmit the token 248 to the merchant device 206 and the merchant device 206 may transmit the token 248 to the mobile device 204 over the wireless signals 246, which may be short range wireless signals, such as BLUETOOTH® and/or near field communication (NFC) signals. The token 248 may take the form of a quick response (QR) code, a bar code, and/or another form of encoded data that may be scanned by the merchant device 206 to provide the user with the free drink.

Figure 2C:
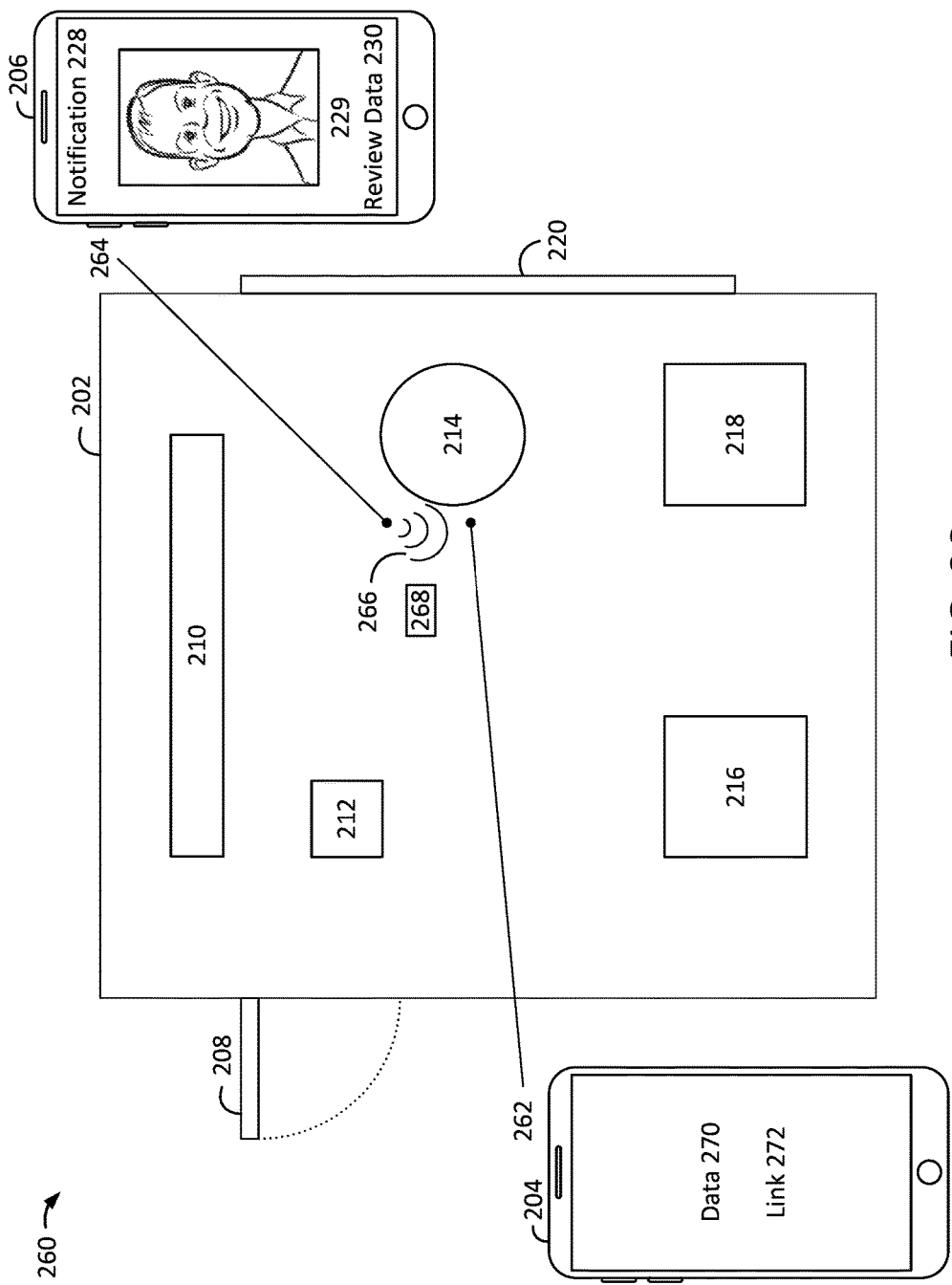
FIG. 2C illustrates an exemplary system with client devices and respective locations of the client devices, according to an embodiment.

FIG. 2C illustrates an exemplary system 260 with client devices 204 and 206, and respective locations 262 and 264 of the client devices 204 and 206, according to an embodiment. The system 260 may also include aspects of the system 100 described above in FIG. 1, such as the server 102 and/or the one or more networks 108. The client devices 204 and 206 may take the form of the client devices 104 and 106, respectively, described above in relation to FIG. 1. In one example, FIG. 2B also provides the map 202 of the restaurant with the door 208, the bar 210, the hosting booth 212, the tables 214-218, and the window 220. In one scenario, the user of the mobile device 204 may be seated at the table 214 proximate to the window 220. In this scenario, the system 260 may alert the waiter/waitress with the merchant device 206 regarding the user of the mobile device 204. For example, the system 200 may provide the image 229 of the user and the review data 230 indicating a number of negative reviews previously provided by the user, such that the waiter/waitress may provide the user with proper services and/or attention to avoid a negative review.

In some embodiments, the system 260 may also generate data 270 based on the third location 262 of the mobile device 204. For example, the data 270 may provide a special for a complimentary or discounted appetizer or dish. The system 260 may transmit the generated data 270 to the mobile device 204 such that the user may be alerted of the special on the display of the mobile device 204. In some instances, the system 260 may request a confirmation from the merchant device 206 to send the data 270 to the mobile device 204 prior to transmitting the data 270. As such, the system 260 may transmit the generated data 270 to the mobile device 204 based on a confirmation received from the merchant device 206 to transmit the data 270 to the mobile device 204. Yet, the system 260 may transmit the data 270 to the merchant device 206 and the merchant device 206 may transmit the data 270 to the mobile device 204 over the wireless signals 266, which may be short range wireless signals, such as BLUETOOTH® and/or near field communication (NFC) signals.

In some embodiments, the system 260 may also generate data 270 to include a token 268, possibly referred to as a food token 268, based on the location 262 of the mobile device 204 seated at the table 214. The system 260 may also transmit the token 268 to the mobile device 204 based on the location 262 of the mobile device 204, such that the user may be alerted of the token 268 on the display of the mobile device 204. In some instances, the system 260 may request a confirmation from the merchant device 206 to send the token 268 to the mobile device 204 prior to transmitting the token 268. As such, the system 260 may transmit the token 268 to the mobile device 204 based on a confirmation received from the merchant device 206 to transmit the token 268 to the mobile device 204. Yet, the system 260 may transmit the token 268 to the merchant device 206 and the merchant device 206 may transmit the token 268 to the mobile device 204 over the wireless signals 266, which may be short range wireless signals, such as BLUETOOTH® and/or near field communication (NFC) signals. The token 268 may take the form of a quick response (QR) code, a bar code, and/or another form of encoded data that may be scanned by the merchant device 206 to provide the user with a complimentary or discounted appetizer or dish.

In some embodiments, the system 260 may determine an image application of the mobile device 204 is accessed, possibly from the data retrieved from the operating system 135 of the mobile device 204. For example, the user may be taking a picture with the image application on the mobile device 204, possibly to capture an image of food delivered to the table 214. In some instances, the system 260 may generate data including a link 272 to a website or mobile app configured to receive one or more reviews for the restaurant based on determining the image application is accessed. As such, the system 260 may transmit the link 272 to the mobile device 204 based on determining the image application is accessed, possibly to encourage the user to leave a positive review for the restaurant.

Figure 2D:
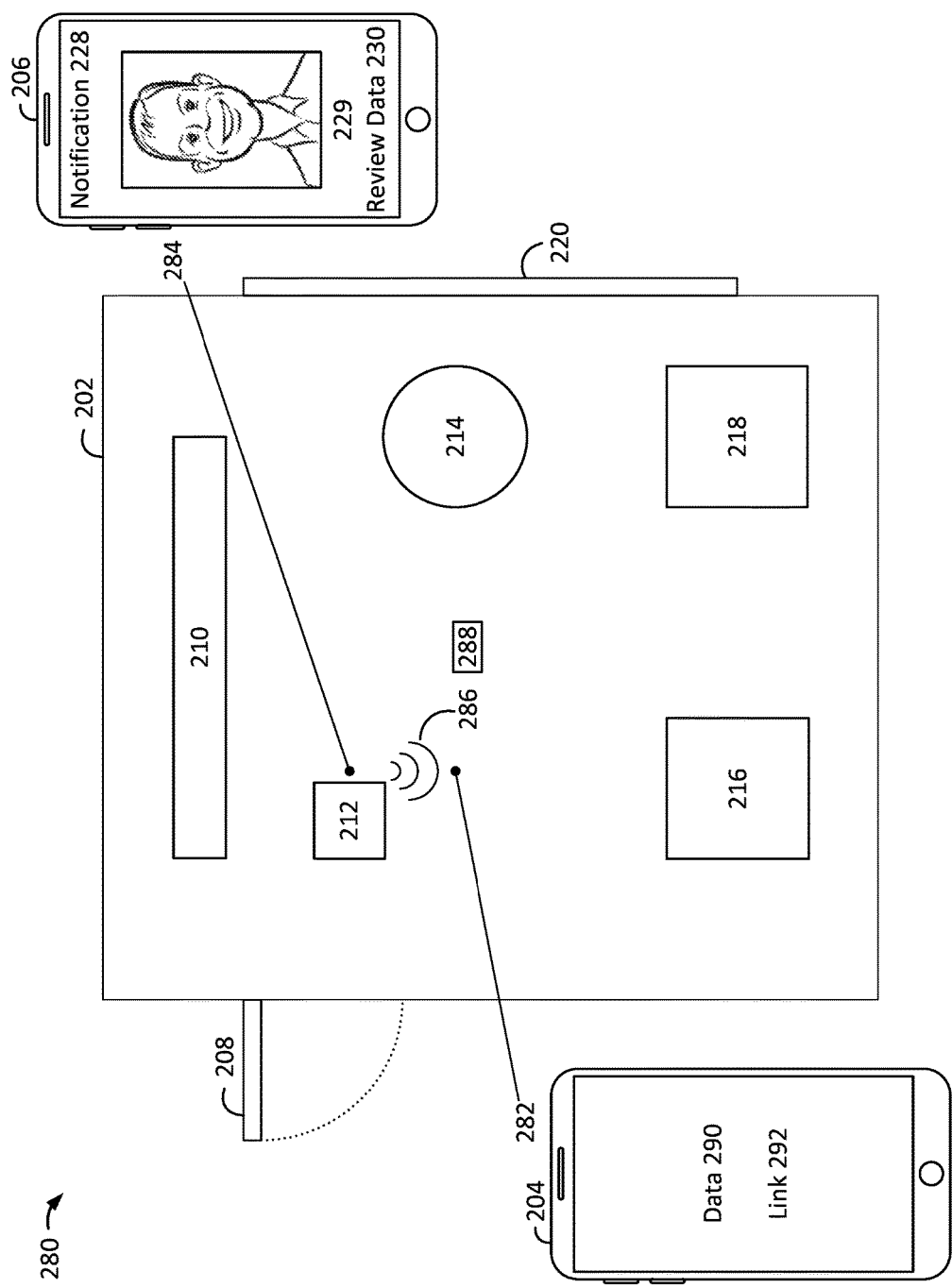
FIG. 2D illustrates an exemplary system with client devices and respective locations of the client devices, according to an embodiment.

FIG. 2D illustrates an exemplary system 280 with client devices 204 and 206, and respective locations 282 and 284 of the client devices 204 and 206, according to an embodiment. The system 280 may also include aspects of the system 100 described above in FIG. 1, such as the server 102 and/or the one or more networks 108. The client devices 204 and 206 may take the form of the client devices 104 and 106, respectively, described above in relation to FIG. 1. In one example, FIG. 2B also provides the map 202 of the restaurant with the door 208, the bar 210, the hosting booth 212, the table 214, the table 216, the table 218, and the window 220. In one scenario, the user of the mobile device 204 may be exiting the restaurant. In this scenario, the system 280 may alert the host/hostess with the merchant device 206 regarding the user exiting the restaurant. For example, the system 200 may provide the image 229 of the user and the review data 230 indicating a number of negative reviews previously provided by the user.

In some embodiments, the system 280 may also generate data 290 based on the fourth location 282 of the mobile device 204. For example, the data 290 may provide a special for the user's next visit to the restaurant, such as a discount on the user's next meal at the restaurant. The system 280 may transmit the generated data 290 to the mobile device 204 such that the user may be alerted of the special on the display of the mobile device 204. In some instances, the system 280 may request a confirmation from the merchant device 206 to send the data 290 to the mobile device 204 prior to transmitting the data 290. As such, the system 280 may transmit the generated data 290 to the mobile device 204 based on a confirmation received from the merchant device 206 to transmit the data 290 to the mobile device 204. Yet, the system 280 may transmit the data 290 to the merchant device 206 and the merchant device 206 may transmit the data 290 to the mobile device 204 over the wireless signals 286, which may be short range wireless signals, such as BLUETOOTH® and/or near field communication (NFC) signals.

In some embodiments, the system 280 may also generate data 290 to include a token 288, possibly referred to as a restaurant token 288, based on the location 262 of the mobile device 204 seated at the table 214. The system 280 may also transmit the token 288 to the mobile device 204 based on the location 282 of the mobile device 204, such that the user may be alerted of the token 288 on the display of the mobile device 204. In some instances, the system 280 may request a confirmation from the merchant device 206 to send the token 288 to the mobile device 204 prior to transmitting the token 288. As such, the system 280 may transmit the token 288 to the mobile device 204 based on a confirmation received from the merchant device 206 to transmit the token 288 to the mobile device 204. Yet, the system 280 may transmit the token 288 to the merchant device 206 and the merchant device 206 may transmit the token 288 to the mobile device 204 over the wireless signals 286, which may be short range wireless signals, such as BLUETOOTH® and/or near field communication (NFC) signals. The token 288 may take the form of a quick response (QR) code, a bar code, and/or another form of encoded data that may be scanned by the merchant device 206 to provide the user with a discount on the user's next meal at the restaurant.

In some embodiments, the system 280 may determine an image application of the mobile device 204 is accessed, possibly from the data retrieved from the operating system 135 of the mobile device 204. For example, the user may be taking a picture with the image application on the mobile device 204, possibly to capture an image of the user and his/her guest before exiting the restaurant. In some instances, the system 280 may generate data including a link 292 to a website configured to receive one or more reviews for the restaurant based on determining the image application is accessed. As such, the system 280 may transmit the link 292 to the mobile device 204 based on determining the image application is accessed to encourage the user to leave a positive review for the restaurant.

Figure 3A:
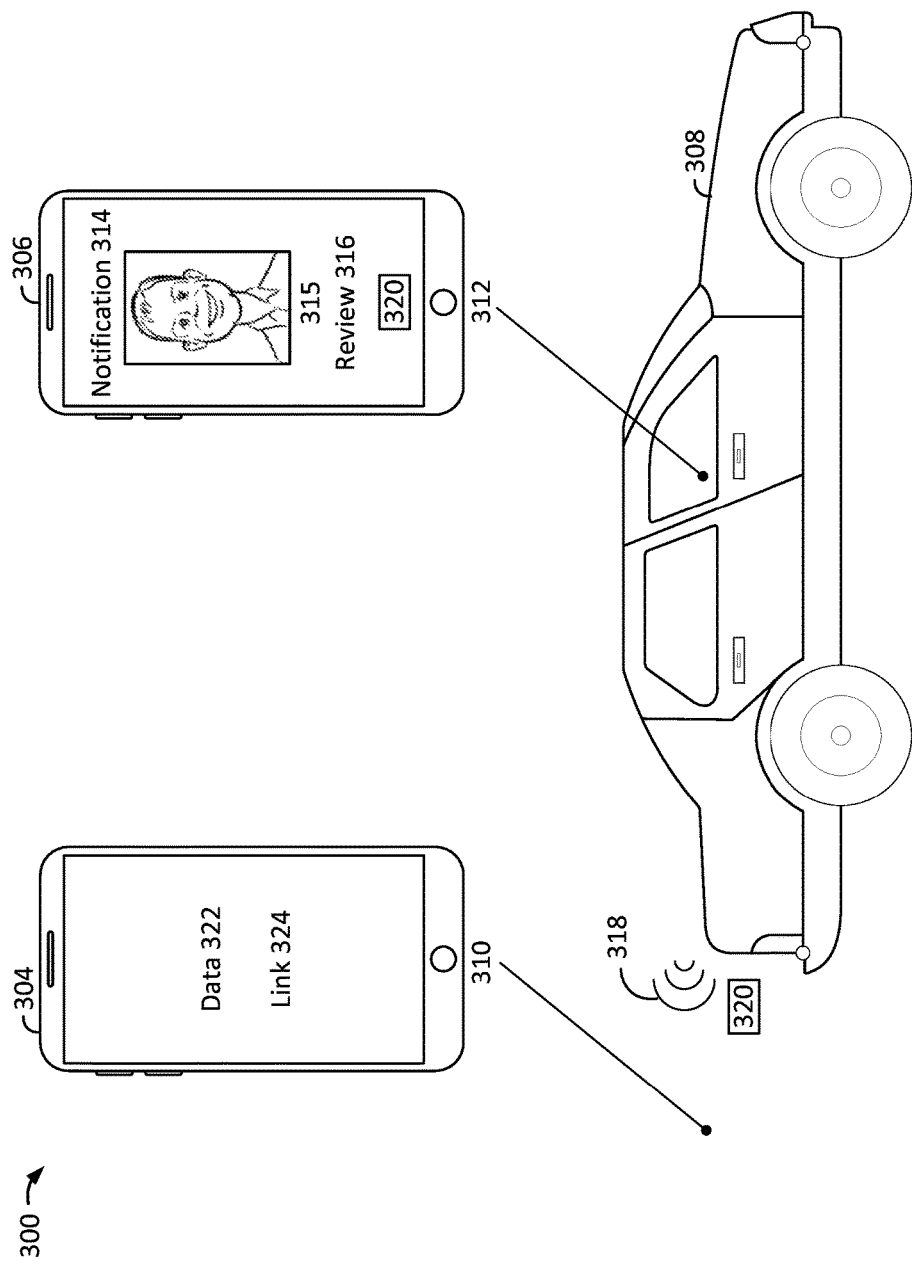
FIG. 3A illustrates an exemplary system with client devices and a vehicle, according to an embodiment.

FIG. 3A illustrates an exemplary system 300 with client devices 304 and 306, and a vehicle 308, according to an embodiment. The system 300 may also include aspects of the system 100 described above in FIG. 1, such as the server 102 and/or the one or more networks 108. The client devices 304 and 306 may take the form of the client devices 104 and 106, respectively, described above in relation to FIG. 1. In one example, the vehicle 308 may be a ride-share vehicle that the user of the client device 304 requested. In one scenario, the user may be proximate to the vehicle 308, possibly entering the vehicle 308 or exiting the vehicle 308. In this scenario, the system 300 may alert the driver with the mobile device 306 with the notification 314 including an image 315 of the user and review data 316 indicating previous reviews that the user has provided, possibly reviews regarding previous ride-share drivers.

In some embodiments, the system 300 may determine a location 310 of the mobile device 304 that created the vehicle request. The location 310 of the mobile device 304 may correspond to a location 312 of the driver's device 306 associated with the request for the vehicle 308. For example, the location 310 may be proximate to and/or in range with the location 312 to receive wireless signals 318 from the vehicle 308 and/or the mobile device 306 as described further herein. The system 300 may retrieve data 322 from the mobile device 304 based on the location 310 of the mobile device 304. The system 300 may identify a number of user reviews from the data 322 retrieved from the mobile device. The system 300 may also determine a user review indicator, such as the average rating average user review based on the number of user reviews. For example, the system 300 may determine the user's average review is one or two stars out of five stars, a score of one to three out of ten, one to fifteen percent out of one hundred percent, among multiple negatively written comments regarding previous drivers.

In some instances, the system 300 may generate the notification 314 with the review data 316 including the user review indicator, such as the average review and/or a summary of the user's reviews (e.g., the user's prior reviews). The system 300 may transmit the notification 314 to the driver's device 306 including the user review indicator, possibly including the average user review. Yet further, the notification 314 may also include an image 315 of the user. Notably, the system 300 may include a non-transitory machine-readable medium having stored thereon machine-readable instructions executable to cause the system 300 to perform operations described herein, such as transmitting the notification 314 to the driver's device 306.

In some embodiments, the system 300 may determine a number of the user's reviews correspond to a number of prior ride-share vehicle requests. For example, the user's reviews may include a number of one star and/or two star reviews, and/or multiple negative comments regarding prior drivers, among other possibilities. As such, the system 300 may generate the review data 316 based on the number of user reviews corresponding to the number of prior vehicle requests. For example, the review data 316 may indicate five one-star reviews, seven two-star reviews, one three-star review, zero four or five star reviews, and/or four negative written comments regarding the lack of air conditioning in prior ride-share vehicles. As such, the system 300 may transmit the review data 316 to the driver's device 306.

In some embodiments, the system 300 may generate a rider token 320 based on the user review indicator, such as the average review provided by the user of the mobile device 304. For example, the rider token 320 may provide the user with a free ride by one or more ride-sharing vehicles, such as the vehicle 308. As noted, the system 300 may transmit the review data 316 to the driver's device 306. As such, the system 300 may transmit the rider token 320 to the driver's device 306 to transfer the token 320 to the mobile device 304. Yet, the system 300 may transmit the rider token 320 to the driver's device 306 and the driver's device 306 may transmit the rider token 320 to the mobile device 304 over the wireless signals 318, which may be short range wireless signals, such as BLUETOOTH® and/or near field communication (NFC) signals. The rider token 320 may take the form of a quick response (QR) code, a bar code, and/or another form of encoded data that may be scanned by the driver's device 306 to provide the user with the free ride.

Figure 3B:
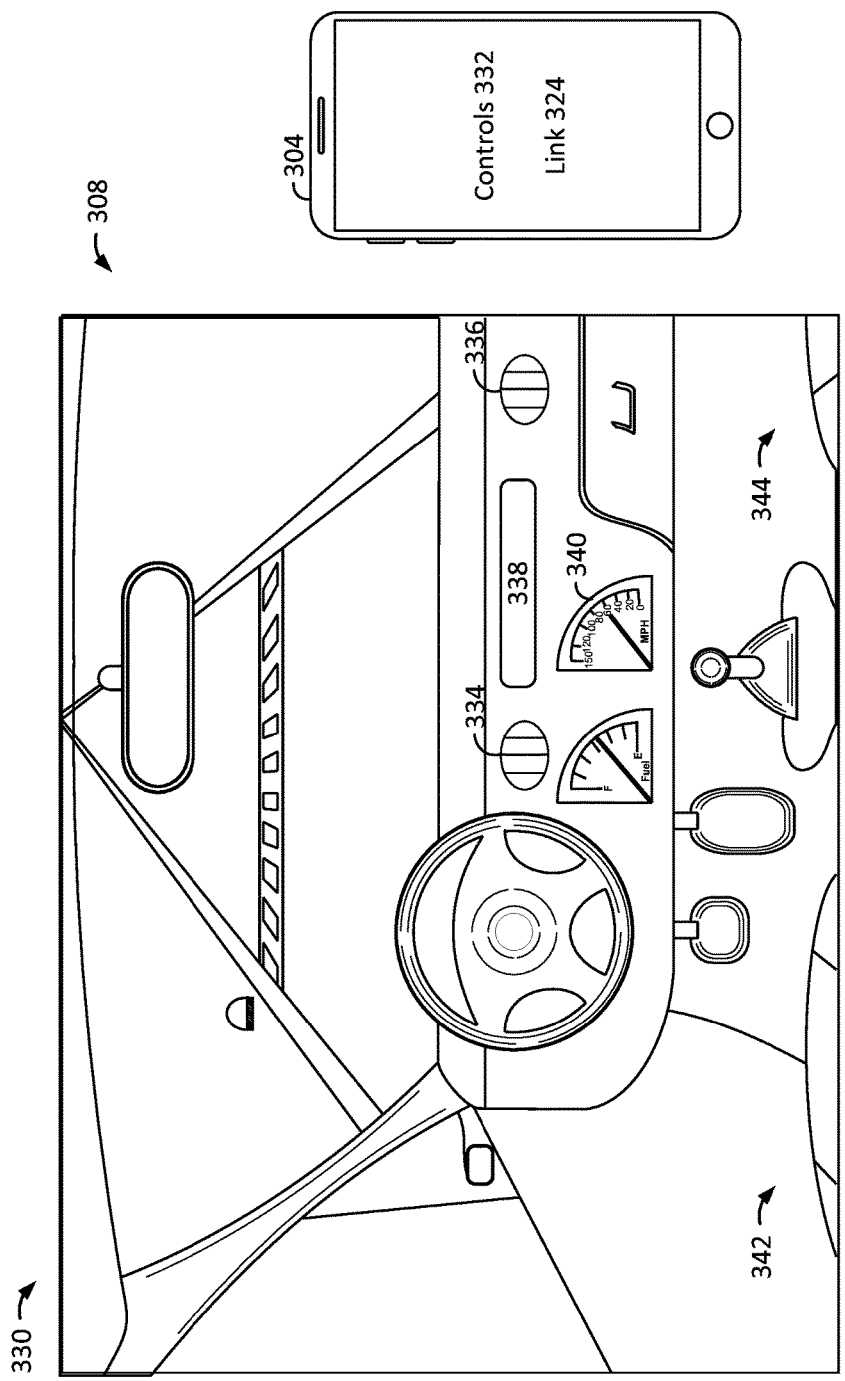
FIG. 3B illustrates an exemplary system with a vehicle, according to an embodiment.

FIG. 3B illustrates an exemplary system 330 with the vehicle 308, according to an embodiment. The system 330 may also include aspects of the system 100 described above in FIG. 1, such as the server 102 and/or the one or more networks 108. In one example, the vehicle 308 may be the ride-share vehicle that the user of the client device 304 requested, as described above. In one scenario, the user may be in the back seat of the vehicle 308. Further, various aspects of the vehicle 308 may be controlled, such as the heating, ventilation, and air conditioning (HVAC) 334 and/or 336, the audio system 338, one or more target speeds of the vehicle 308 provided on the speed gauge 340, the position of the driver's seat 342, and/or the position of the passenger's seat 344. For example, consider where the review data 316 indicates negative written comments regarding the lack of air conditioning in prior ride-share vehicles. In such instances, the HVAC 334 and/or 336 may initiate the air conditioning as the user enters the vehicle 308.

In some embodiments, the system 330 may determine one or more preferences based on the number of reviews provided by the user. As noted, the user's reviews may indicate multiple one to two-star reviews and/or four negative written comments regarding the lack of air conditioning in prior ride-share vehicles. As such, the system 330 may cause the vehicle 308 to control the HVAC 334 and/or 336 to provide air conditioning to the user based on the user's preferences. Yet, in another scenario, the system 330 may determine preferences from the user's reviews for certain music to be played or certain music not to be played, the user's reviews for previous drivers driving too fast or too slow, and/or the user's reviews for prior drivers with the driver's seat being positioned too far back such that the user did not have much room in the back seat, among other possibilities. As such, the system 300 may adjust the audio system 338 to a given playlist, such as one created by the user on the mobile device 304. The system 300 may also set a target speed on the speed gauge 340 and/or position the driver's seat 342 and/or the passenger's seat 344 such that the user has sufficient room in the backseat, among other possibilities.

In some embodiments, the system 330 may generate one or more digital controls 332 for air conditioner, an audio system, and a target speed of the vehicle 308 displayed by the speed gauge 340 based on the number of user reviews described above. For example, the digital controls 332 may be configured to remotely control the HVAC 334 and/or 336, the audio system 338, the target speed displayed on the speed gauge 340, the position of the driver's seat 342, and/or the position of the passenger's seat 344. The system 300 may also transmit the one or more digital controls 332 to the mobile device 304 to control at least one of the HVAC 334 and/or 336, the audio system 338, the target speed displayed on the speed gauge 340, the position of the driver's seat 342, the position of the passenger's seat 344, and/or lights in the back seat of the vehicle 308, among other possibilities. Notably, the digital controls 332 may deactivated based on a driver input received from the driver's device 306, possibly where the controls 332 may be distracting the driver.

In some embodiments, the system 300 may determine the vehicle 308 has arrived at the destination indicated by the vehicle request created with the mobile device 304. Referring back to FIG. 3A, the system 300 may transmit the token 320 to the mobile device 304 to provide the user with a free ride for future use. Yet further, the system 300 may generate a link 324 to a website configured to receive one or more reviews associated with the vehicle request and/or the driver of the vehicle 308. As such, the system 300 may transmit the link 324 to the mobile device 304 such that the user may be encouraged to leave a positive review for the driver. In one scenario, referring to FIG. 3B, the link 324 may be transmitted to the mobile device 304 with the digital controls 332 to encourage the user to leave a positive review for the driver. In some instances, the system 300 may request a confirmation from the driver's device 306 to transmit the link 324 and/or the controls 332 to the mobile device 304. As such, the system 300 may transmit the link 324 and/or the controls 332 based on a confirmation received from the driver's device 306.

Figure 4A:
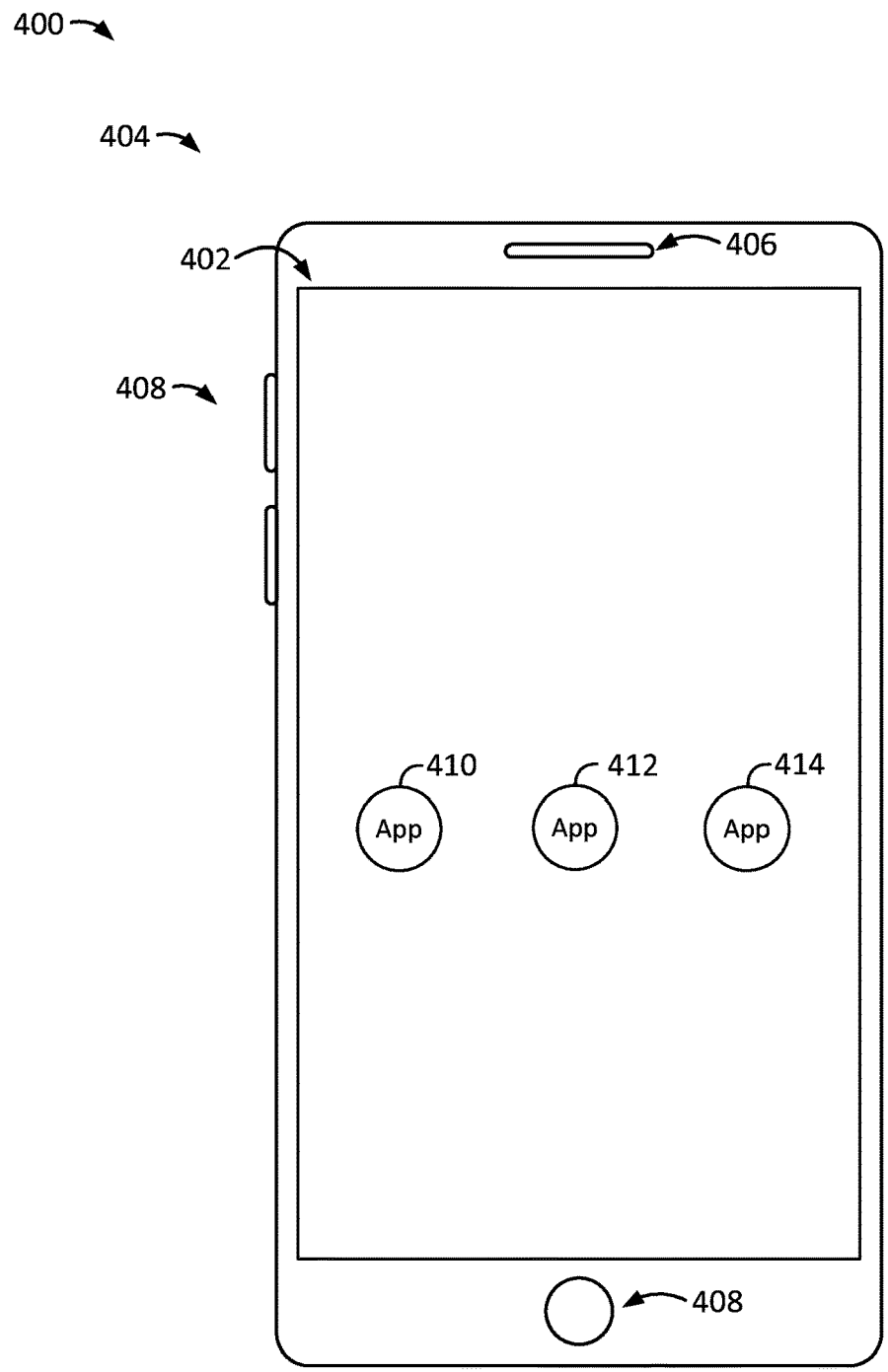
FIG. 4A illustrates an exemplary system with a provider application, according to an embodiment.

FIG. 4A illustrates an exemplary system 400 with a provider application 410, according to an embodiment. The system 400 may also include aspects of the system 100 described above in FIG. 1, such as the server 102 and/or the one or more networks 108. The client device 404 may take the form of one of the client devices 104, 204, and/or 304 described above in relation to FIGS. 1-3. Further, the display interface 402, the speaker 406, and/or the buttons 408 may be part of an input/output (I/O) interface of the mobile device 404, such as the I/O interface 130 described herein.

In some embodiments, the system 400 may determine the provider application 410 installed on the mobile device 404. In one example, the server 102 of the system 400 may communicate with the mobile device 404 over the one or more networks 108 and retrieve the data packet 122 indicating the provider application 410 is installed on the mobile device 404. Further, the data packet 122 may indicate the review application 412 and/or the ride-sharing application 414 may also be installed on the mobile device 404.

In some embodiment, the system 400 may cause the provider application 410 to retrieve data from one or more of the mobile applications 412 and/or 414 installed on the mobile device 404. For example, referring back to FIG. 3A, consider a scenario where the mobile device 304 has the provider application 410 installed on the mobile device 304. In some instances, the data 322 may be retrieved from the mobile device 304 based on causing the provider application 410 to retrieve the data 310 from one or more of the mobile applications 412 and/or 414.

Figure 4B:
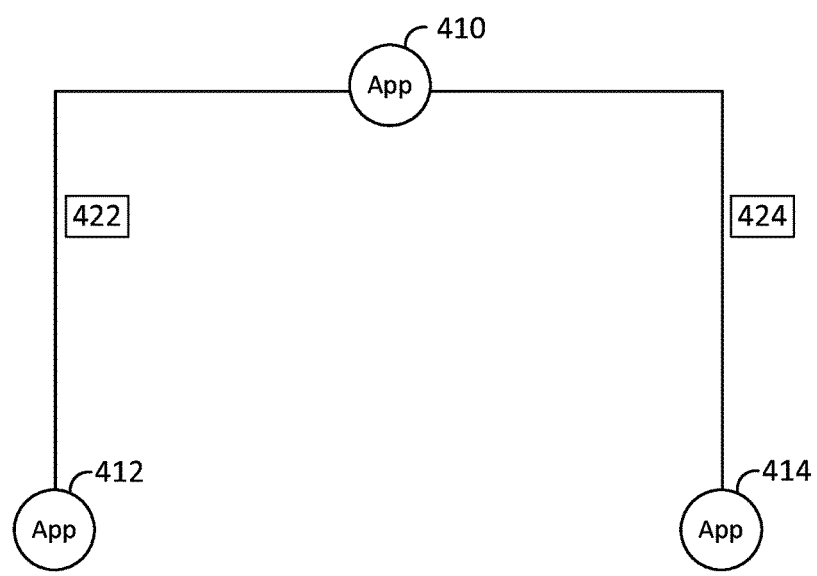
FIG. 4B illustrates the exemplary system with data retrieved by a provider application, according to an embodiment.

FIG. 4B illustrates the exemplary system 420 with data 422 and/or 424 retrieved by the provider application 410, according to an embodiment. The system 420 may also include aspects of the system 100 described above in FIG. 1, such as the server 102 and/or the one or more networks 108.

In some embodiments, the system 420 and/or the server 102 may determine the provider application 410 is installed on the mobile device 404. Further, the system 420 and/or the server 102 may cause the provider application 410 to retrieve the data 422 and/or 422 from one or more of the mobile applications 412 and/or 414 installed on the mobile device. As such, referring back to FIGS. 2A-4A, the systems 200, 240, 260, 280, 300, 330, and/or 400 may retrieve data from various mobile devices 204, 304, and/or 404 based on causing the provider application 410 to retrieve the data 422 and/or 422 from one or more of the mobile applications 412 and/or 414. In some instances, the system 240 may retrieve and provide various forms of review data 422 and/or 424 to the other entities and/or merchants. Thus, the system 240 may improve existing technical fields or technologies by enabling merchants to access the review data 422 and/or 424, and proactively provide better user experiences and avoid negative reviews.

Figure 5:
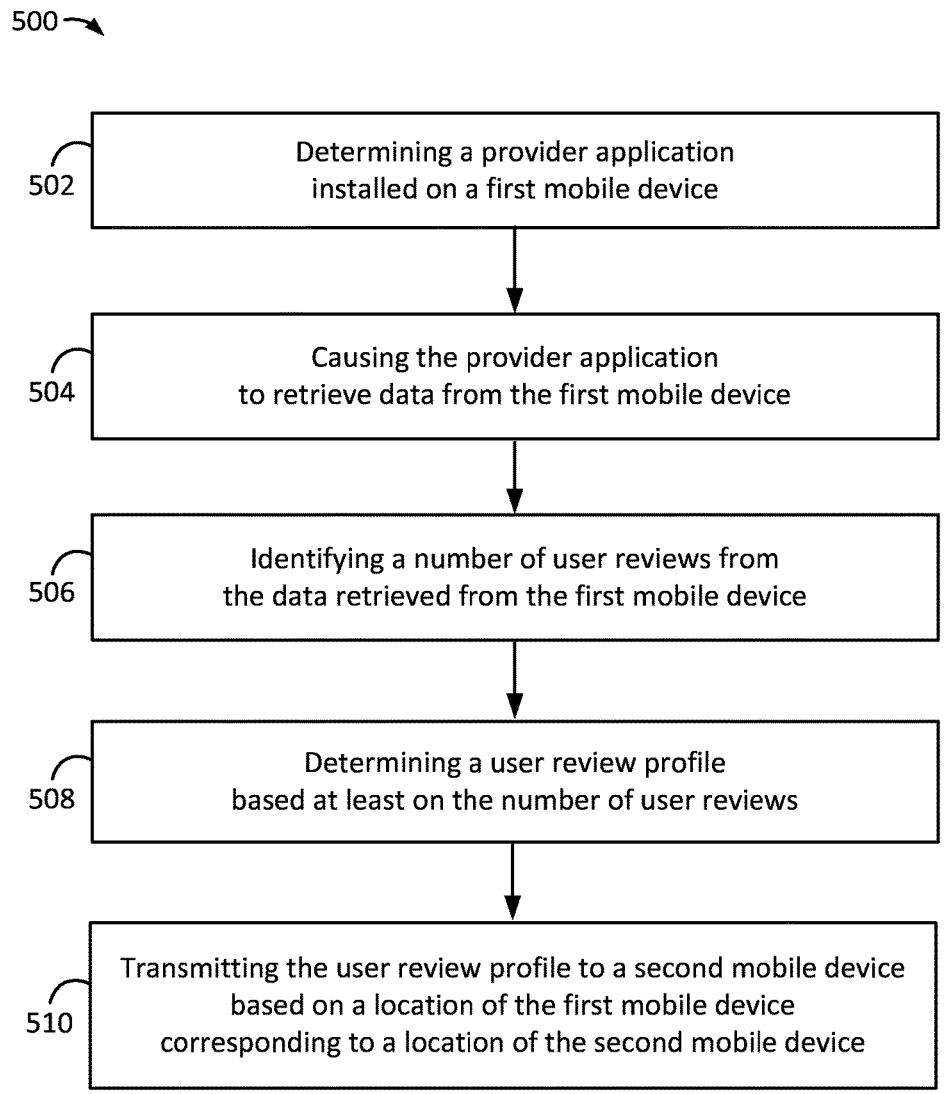
FIG. 5 illustrates an exemplary method, according to an embodiment.

FIG. 5 illustrates an exemplary method 500, according to an embodiment. One or more steps of the method 500 described herein may be omitted, performed in a different sequence, and/or combined with other methods for various types of scenarios contemplated herein.

At step 502, the method 500 may include determining a provider application installed on a first mobile device. For example, referring back to FIGS. 4A-4B, the system 400 may determine the provider application 410 is installed on the first mobile device 404.

At step 504, the method 500 may include causing the provider application to retrieve data from the first mobile device. For example, referring back to FIGS. 4A-4B, the system 400 may cause the provider application 410 to retrieve the data 422 and/or 424 from the other mobile applications 412 and/or 414, respectively.

At step 506, the method 500 may include identifying a number of user reviews from the data retrieved from the first mobile device. For example, referring back to FIGS. 4A-4B, the system 400 may identify a number of user reviews from the data 422 and/or 424 retrieved from the other mobile applications 412 and/or 414, respectively. In one scenario, the user reviews may include one to five star reviews provided with the mobile applications 412 and/or 414. In particular, the data 422 may indicate reviews of restaurants provided with the mobile application 412. The data 424 may indicate reviews of ride-share drivers provided with the mobile application 414.

At step 508, the method 500 may include determining a user review profile based on the number of user reviews. For example, the user review profile may provide the rating indicator, such as an average rating of a number of ratings provided by the user, the average star rating, possibly being one or two stars, as described herein. Further, the user review profile may provide the frequency in which the user provides reviews, such as daily, weekly, and/or monthly. Yet further, the user review profile may provide the frequency in which the user provides written comments, such as negative comments regarding prior restaurants, establishments, drivers, and/or other personnel.

In one example, the user review profile may provide the frequency in which the user provides negative written comments. In yet another example, the user review profile may provide common written comments, such as repetitive written comments. In one scenario, the repetitive written comments may indicate the lack of air-conditioning in prior ride-share vehicles as described herein and/or written comments that indicate drivers declining the user's requests for ride-sharing vehicles. In another scenario, as further contemplated above, the repetitive written comments may indicate instances of the user having to wait to be seated at multiple restaurants, among other possibilities.

At step 510, the method 500 may include transmitting the user review profile to a second mobile device based on a location of the first mobile device corresponding to a location of the second mobile device. For example, referring back to FIGS. 4A-4B, the system 400 may transmit the user review profile to a second merchant device based on the location of the first mobile device 404 corresponding or approaching the merchant device.

In one scenario, referring back to FIGS. 2A-2D, the system 200 may transmit the user review profile including the image 229 and the review data 230 to the second mobile device 206 based on the location 222 of the first mobile device 204 corresponding or approaching the second mobile device 206.

FIG. 6A illustrates an exemplary process 600, according to an embodiment. The process 600 may involve a provider application 602, an interface 604, an operating system 606, and one or more mobile applications 608. For example, the provider application 602 may take the form of the provider application 410, the interface 604 may take the form of the interface 402, and the one or more mobile applications 608 may take the form of the mobile applications 412 and/or 414 on the mobile device 404 described above in relation to FIGS. 4A-4B. Further, the operating system 606 may take the form of the operating system 135 described in relation to FIG. 1.

One or more steps of the process 600 described herein may be omitted, performed in a different sequence, and/or combined with other methods for various types of scenarios contemplated herein. For example, one or more of the steps 610-616 in the process 600 may be combined with one or more of the steps 502-510 in the method 500. In another example, the first mobile device described herein may take the form of the mobile device 404 and the second mobile device may take the form of the mobile devices 106, 206, and/or 306, among other possible devices described herein.

At step 610, the process 600 may include causing the provider application 602 to request the operating system 606 of the first mobile device for data. For example, referring back to FIGS. 4A-4B, the provider application 602 may take the form of the provider application 410. As such, the provider application 602 may request the data 422 and/or 424 from the operating system 606 and/or the mobile applications 608 with an application programming interface (API) request.

At step 612, the process 600 may include causing the operating system 606 to perform a validation with the provider application 602. In some instances, the validation may be required to retrieve the data 422 and/or 424 from the operating system 606 and/or the mobile applications 608 based on the request. In one example, the operating system 606 may run the validation to ensure the authenticity of the provider application 602 and/or the request from the provider application 602. In some instances, the operating system 606 may call the provider application 602 and validate one or more responses from the provider application 602. In one scenario described above, the data 422 and/or 424 from the first mobile device 404 may be retrieved based on the validation with the provider application 602.

At step 614, the process 600 may include causing the operating system 606 to retrieve the data 422 and/or 424 from one or more applications 608 installed on the first mobile device 404 based on the validation. In particular, the provider application 602 may retrieve the data 422 and/or 424 from the one or more applications 608, including the mobile applications 412 and/or 414.

At step 616, the process 600 may include retrieving the data 422 and/or 424 from the one or more applications 608. Further, the data 422 and/or 424 retrieved may include review data as described further herein, such as the review data 230 and/or 316.

FIG. 6B illustrates an exemplary process 620, according to an embodiment. The process 620 may involve the provider application 602, the interface 604, the operating system 606, and the one or more mobile applications 608 described above in relation to FIG. 6A. Further, the network 610 shown may take the form of the network 108 described in relation to FIG. 1.

One or more steps of the process 620 described herein may be omitted, performed in a different sequence, and/or combined with other methods for various types of scenarios contemplated herein. For example, one or more of the steps 622-630 in the process 620 may be combined with one or more of the steps 502-510 in the method 500 and/or the steps 610-616 in the process 600 described herein.

At step 622, the process 620 may include causing the provider application 602 to request the operating system 606 of the first mobile device 404 for data, possibly similar to the step 610 described above. In particular, the provider application 602 may call the operating system 606 for review data received from the interface 604.

At step 624, the process 620 may include causing the operating system 606 to perform a validation with the provider application 602, such that the provider application 602 may retrieve the data 422 and/or 424 based on the request. For example, the validation may be performed in a similar manner as described above in relation to step 612. Yet, in one example, the provider application 602 may be provided with an IP address to access the network 610 and retrieve the data 422 and/or 424.

At step 626, the process 620 may include causing the provider application 602 to access one or more networks 610 based on the validation with the provider application 602. In one scenario, the provider application 602 may access the requested data 422 and/or 424 from the one or more networks 610, possibly including a storage network that stores review data 422 and/or 424 received from the interface 604 of the first mobile device.

At step 628, the process 620 may include requesting one or more mobile applications 608 installed on the first mobile device 404 for the data 422 and/or 424 based on the validated access to the one or more networks 610. In one scenario, the process 620 may include causing the validated request from the provider application 602 to transfer from the network 610 to the one or more mobile applications 608.

At step 630, the process 620 includes retrieving the data 422 and/or 424 from the first mobile device 404 based on the validated access to the one or more networks 610. In one scenario, data stored 422 and/or 424 for the one or more applications 608 may be retrieved and transmitted to the provider application 602. Thus, the data 422 and/or 424 from the first mobile device 404 may be retrieved based on the validated access to the one or more networks 610. For example, the data 422 and/or 424 may be retrieved from the storage network, as described above.

In some embodiments, the processes 600 and/or 620 may include determining one or more preferences based on the number of user reviews. For example, referring back to FIG. 3A, transmitting the notification 314 to the driver may include transmitting the one or more preferences to the driver's mobile device 306. Notably, a user account associated with a provider may store various reviews provided by a user. In one example, the provider application 602 may retrieve the reviews from various other mobile applications 608 and store the reviews with the user account. In one scenario, the user account may also compile the reviews to generate the user review profile. Notably, the user review profile may include the rating indicator, such as the average rating provided by the user, the average star rating, possibly being one, two, or three stars, as described herein. Further, the user review profile may provide the frequency in which the user provides reviews, such as daily, weekly, and/or monthly. Yet further, the user review profile may provide the frequency in which the user provides reviews including written comments.

Further, the user account may be a shared account, such as a corporate account, such that employees, staff, worker personnel, and/or contractors, among other individuals may have access to the corporate account. In one example, an account may be a family account created for multiple family members, where the account may retrieve reviews provided from one or more members of the family. Yet further, it should be noted that a user may be a number of individuals, a group, and/or possibly a robotic device or system, among other computing devices capable of transferring data associated with the user account. In some instances, data may be required to access the user account and/or perform a transfer with the account. For example, the data required may include user identifier data, such as login data, an email address, a username, a password, a phone number, a security code, an encryption key, authentication data, biometric data (e.g., fingerprint data), and/or other types of data to access the user account and/or perform a transaction with the account.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A system, comprising:
    a non-transitory memory; and
    one or more hardware processors coupled to the non-transitory memory and configured to read instructions from the non-transitory memory to cause the system to perform operations comprising:
        determining a first application installed on a mobile device of a user, wherein the first application is configured to retrieve data from a plurality of other applications installed on the mobile device;
        determining, based on location data obtained from a location component of the mobile device, that a location of the mobile device corresponds to a first location of a first merchant that is associated with a merchant category;
        identifying, among the plurality of other applications installed on the mobile device, a second application associated with the merchant category;
        retrieving, via the first application from the second application, review data corresponding to interactions between the user and a second merchant associated with the merchant category;
        identifying a merchant device associated with the first location based on the location of the mobile device;
        deriving a user preference related to the merchant category based at least on the review data; and
        transmitting the derived user preference to the merchant device.

2. The system of claim 1, wherein the operations further comprise:
    determining a plurality of scores from the review data that corresponds to a plurality of review inputs received by the mobile device;
    determining an average score based on the plurality of scores; and
    transmitting the average score to the merchant device.

3. The system of claim 1, wherein the operations further comprise:
    determining a frequency of negative review inputs by the user based on the review data; and
    transmitting the frequency of negative review inputs to the merchant device.

4. The system of claim 1, wherein the user preference derived from the review data comprises a negative user preference, and wherein the user preference is transmitted to the merchant device in response to detecting a check-in operation corresponding to the first location performed by the mobile device.

5. The system of claim 1, wherein the operations further comprise:
    determining, based on the location data retrieved from the mobile device, that the location of the mobile device corresponds to a sub-area within the first location;
    generating data based at least on the sub-area within the first location; and
    transmitting the generated data to the mobile device based at least on a confirmation received from the merchant device to transmit the generated data to the mobile device.

6. The system of claim 5, wherein generating the data comprises generating a token based at least on the sub-area within the first location, and wherein the operations further comprise:
    causing the mobile device to display the token.

7. The system of claim 1, wherein the operations further comprise:
    determining an image application of the mobile device is accessed;
    generating a link to a website configured to receive one or more reviews based at least on determining the image application is accessed; and
    transmitting the link to the mobile device.

8. A non-transitory machine-readable medium having stored thereon machine-readable instructions executable to cause a machine to perform operations comprising:
    determining a first application installed on a mobile device of a user, wherein the first application is configured to retrieve data from a plurality of other applications installed on the mobile device;
    determining, based on location data obtained from a location component of the mobile device, that a location of the mobile device corresponds to a first location of a first merchant that is associated with a merchant category;
    identifying, among the plurality of other applications installed on the mobile device, a second application associated with the merchant category;
    retrieving, via the first application from the second application, review data corresponding to interactions between the user and a second merchant associated with the merchant category;
    identifying a merchant device associated with the first location based on the location of the mobile device;
    deriving a user review indicator based at least on the review data; and
    transmitting a notification comprising the user review indicator to the merchant device.

9. The non-transitory machine-readable medium of claim 8, wherein the first location corresponds to a location of a first ride-sharing vehicle, and wherein the review data corresponds to a plurality of vehicle requests associated with at least a second ride-sharing vehicle.

10. The non-transitory machine-readable medium of claim 9, wherein the operations further comprise:
   generating a link to a website configured to receive one or more reviews associated with a ride sharing experience, and
   transmitting the link to the mobile device based at least on a confirmation received from the merchant device.

11. The non-transitory machine-readable medium of claim 9, wherein the operations further comprise:
   deriving, based on the review data, user configuration preferences for at least one of a heater, ventilator, and air conditioner (HVAC) unit, an audio system, a speed, a seat position based at least on the review data; and
   transmitting the user configuration preferences to the first ride-sharing vehicle.

12. The non-transitory machine-readable medium of claim 9, wherein the second application installed on the mobile device is a ride-sharing mobile application.

13. The non-transitory machine-readable medium of claim 8, wherein the operations further comprise:
   generating a token based at least on the user review indicator; and
   transmitting the token to the mobile device.

14. The non-transitory machine-readable medium of claim 8, wherein the operations further comprise:
   determining one or more user preferences based at least on the review data; and
   transmitting the one or more user preferences to the merchant device.

15. A method, comprising:
   determining, by one or more hardware processors, a first application installed on a first mobile device of a user, wherein the first application is configured to retrieve data from a plurality of other applications installed on the first mobile device;
   determining, by the one or more hardware processors, based on location data obtained from a location component of the first mobile device, that a location of the first mobile device corresponds to a first location of a first merchant that is associated with a merchant category;
   identifying, by the one or more hardware processors among the plurality of other applications installed on the first mobile device, a second application associated with the merchant category;
   retrieving, by the one or more hardware processors via the first application from the second application, review data corresponding to interactions between the user and a second merchant associated with the merchant category;
   identifying a second mobile device associated with the first location based on the location of the first mobile device;
   determining a user review profile based at least on the review data; and
   transmitting the user review profile to the second mobile device.

16. The method of claim 15, further comprising:
   causing an operating system of the first mobile device to perform a validation with the first application,
   wherein the review data is retrieved in response to the validation of the first application.

17. The method of claim 16, wherein retrieving the review data comprises:
   causing the operating system to retrieve the review data from the second application installed on the first mobile device based at least on the validation.

18. The method of claim 16, wherein retrieving the review data comprises:
   causing the first application to access one or more networks based at least on the validation of the first application, and
   wherein the review data is retrieved based at least on the first application accessing the one or more networks.

19. The method of claim 18,
   wherein the review data is retrieved from a remote server associated with the second application over the one or more networks.

20. The method of claim 15, further comprising:
   deriving one or more preferences based at least on the review data, wherein the user review profile comprises the one or more preferences.

\* \* \* \* \*

UNITED STATES PATENT AND TRADEMARK OFFICE
CERTIFICATE OF CORRECTION

| | |
|---|---|
| PATENT NO. | : 10,160,412 B2 |
| APPLICATION NO. | : 15/289639 |
| DATED | : December 25, 2018 |
| INVENTOR(S) | : Michael Charles Todasco |

It is certified that error appears in the above-identified patent and that said Letters Patent is hereby corrected as shown below:

In the Claims

In Column 21, Line 18-19, change "an audio system, a speed, a seat position" to --an audio system, a speed, or a seat position--

Page 1 of 1

Signed and Sealed this
Twenty-first Day of April, 2020

Andrei Iancu
*Director of the United States Patent and Trademark Office*